(12) United States Patent
Naulleau et al.

(10) Patent No.: US 6,327,102 B1
(45) Date of Patent: Dec. 4, 2001

(54) MINIATURE SELF-CONTAINED VACUUM COMPATIBLE ELECTRONIC IMAGING MICROSCOPE

(75) Inventors: Patrick P. Naulleau, Oakland; Phillip J. Batson, Alameda; Paul E. Denham, Crockett; Michael S. Jones, San Francisco, all of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/520,295

(22) Filed: Mar. 7, 2000

(51) Int. Cl.[7] ............................ G02B 27/02; G02B 21/02
(52) U.S. Cl. ............................. 359/802; 359/656
(58) Field of Search ............................ 359/802, 804, 359/808, 809, 800, 656, 667, 368

(56) References Cited

U.S. PATENT DOCUMENTS 6,101,028 * 8/2000 Heacock et al. ............... 359/368
6,154,305 * 11/2000 Dickensheets et al. ......... 359/225

* cited by examiner

*Primary Examiner*—Georgia Epps
*Assistant Examiner*—Saeed Seyrafi
(74) *Attorney, Agent, or Firm*—John P. O'Banion

(57) ABSTRACT

A vacuum compatible CCD-based microscopic camera with an integrated illuminator. The camera can provide video or still feed from the microscope contained within a vacuum chamber. Activation of an optional integral illuminator can provide light to illuminate the microscope subject. The microscope camera comprises a housing with a objective port, modified objective, beam-splitter, CCD camera, and LED illuminator.

13 Claims, 2 Drawing Sheets

MINIATURE SELF-CONTAINED VACUUM COMPATIBLE ELECTRONIC IMAGING MICROSCOPE

STATEMENT REGARDING FEDERALLY SPONSORED RESEARCH OR DEVELOPMENT

The United States Government has rights in this invention pursuant to Contract No. DE-AC03-76SF00098 between the United States Department of Energy and the University of California.

CROSS-REFERENCE TO RELATED APPLICATIONS

Not Applicable

REFERENCE TO A MICROFICHE APPENDIX

Not Applicable

BACKGROUND OF THE INVENTION

1. Field of the Invention

This invention pertains generally to microscopes, and more particularly to a microscope capable of providing magnified images of a subject contained within a vacuum chamber.

2. Description of the Background Art

Collecting images of experiments and objects located within a vacuum chamber is often difficult. In the past, this problem has been addressed by using glass view ports, view port and external mirror combinations, or combinations of view ports and mirrors within the vacuum chamber that relay information to the view ports. The foregoing have led to less than desirable imaging results. The difficulty with in-vacuum imaging is further complicated when the experiment is sensitive to light. Therefore, there is a need for an apparatus that provides for collection of images from within a vacuum chamber and away from extraneous external light. Such an apparatus could greatly enhance the ability of researchers to gather image data of in-vacuum experiments. The miniature self-contained, vacuum compatible, electronic imaging microscope in accordance with the present invention satisfies that need, as well as others, and overcomes deficiencies in previously known techniques.

BRIEF SUMMARY OF THE INVENTION

The present invention is an imaging microscope for use in vacuum systems. The microscope is self-contained and preferably has an integral light source that can be switched off when performing light sensitive experiments. The microscope can be installed within a pressure vessel to allow the gathering of electronic images, and will function at either positive or negative pressures within the pressure vessel.

By way of example, and not of limitation, the invention comprises a miniature CCD-based pressure compatible microscope with an integrated illuminator. According to an aspect of the invention, the apparatus comprises a microscope objective, a miniature CCD camera, a half-silvered mirror beam splitter, and an LED, all of which are packaged into a pressure compatible package. The optical parameters, such as depth of focus, resolution, and field of view, can all be controlled through the choice of the microscope objective used, and even further freedom is possible through the use of other types of lenses (e.g., macro lenses). According to a still further aspect of the invention, the microscope includes an integrated illuminator that allows the microscope to operate in total darkness.

An object of the invention is to provide for magnified image collection of objects or experiments from within a vacuum chamber.

Another object of the invention is to provide a self-contained means of collecting images from within a vacuum chamber.

Another object of the invention is to provide an integral light source for providing illumination only when needed.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Figure 1:
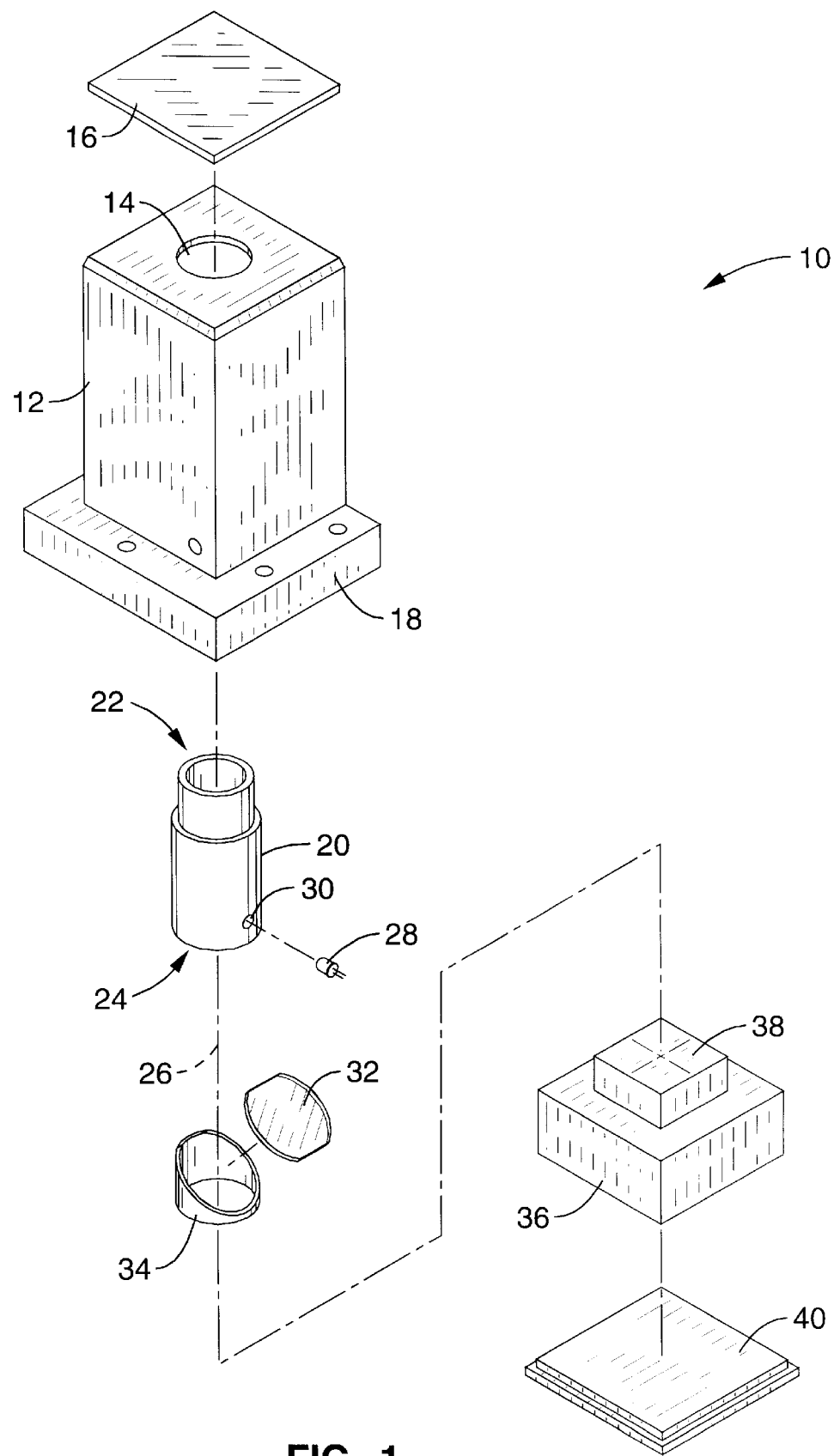
FIG. 1 is an exploded view of an embodiment of an imaging microscope according to the invention.
Figure 2:
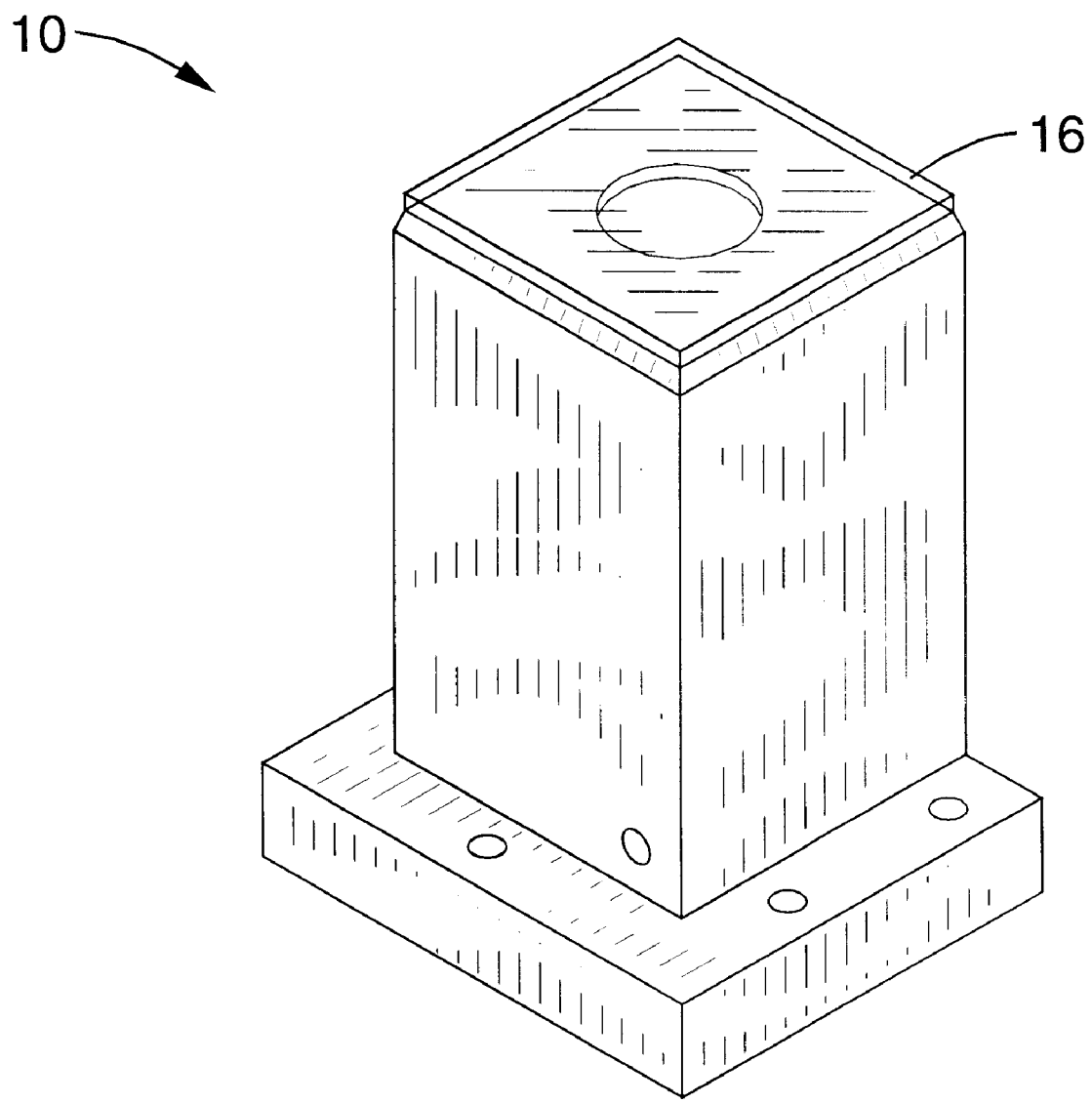
FIG. 2 is an assembled view of the imaging microscope of FIG. 1.

Referring more specifically to the drawings for illustrative purposes, the present invention is embodied in the apparatus generally shown in FIG. 1 and FIG. 2. It will be appreciated that the apparatus may vary as to configuration and as to details of the parts without departing from the basic concepts as disclosed herein.

Referring first to FIG. 1, an embodiment of an electronic imaging microscope 10 according to the invention is shown. The microscope includes a housing 12 with an image aperture 14 that is protected by a glass cover slide 16. The lower end of the housing has an attached or integrally formed base 18 for fastening the microscope in position within a pressure (e.g., vacuum) vessel. The microscope further includes an objective 20 having a proximal end 22, a distal end 24 and an image axis 26. The objective 20 contains one or more internal optical lenses (not shown) of a conventional type for magnifying the image from an object positioned above the cover slide 16. The interior of the objective is preferably coated with a light absorbing material to reduce light reflections therein. A light emitting diode (LED) illuminator 28 is positioned in an opening 30 in the side of objective 20 to provide illumination of the subject. Various illuminators can be used in place of the LED illuminator, and illumination sources of specific wavelengths, such as infrared, may be substituted to enhance subject viewing in certain situations. A beam-splitter 32 reflects light from the LED illuminator up through the image axis 28 of the objective 20 to illuminate the object positioned above the cover slide. The beam-splitter 32 is preferably a half-silvered mirror angled at 45° in relation to the image axis 26. In the preferred embodiment, beam-splitter 32 is retained in a holder 34 which maintains the beam-splitter in the proper orientation within the objective 20 which has been configured for its retention. The microscope also includes a CCD camera module 36, shown with its imaging surface 38 facing up, and which is generally aligned with the image axis 26. A back cover 40 is preferably used to seal the described elements into the housing 12 and thereby create a vacuum tight container.

For the sake of clarity, wiring for the LED illuminator and the CCD imager are not depicted within the figures Typically, these electrical signals are routed to equipment outside the chamber through one or more holes which have been thereafter sealed to prevent vacuum loss as those skilled in the art will readily understand.

By way of example, and not of limitation, an embodiment of the invention was constructed with a housing that is 1.0×1.0 inch square at the top nearest the cover slide and 2.3 inches in length. The width determined primarily in response to the width of the electronic imager used. The magnification employed was 5.6, with a field of view of 1.5×1.0 mm, and a depth of focus of 300 μm on a 20 μm feature with a working distance of 2.3 mm and a resolution of 5 μm. The objective used herein is a commercially available 20× objective with a modified housing. The LED illuminator and CCD imager of this embodiment can be operated from a single 12-volt power supply. Various signal formats can be supported by the electronic imager to provide both still and video images of the subject. Alternately a frame grabber can be used with a video camera to create still images. It should be understood that the above measurements are provided as an example of a preferred embodiment and in no way limit the practice of the invention. Numerous dimensional and structural changes may be introduced without inventive effort to the inventive principles introduced.

Accordingly, it will be seen that the present invention can provide magnified video and still images of subjects within an enclosed system. The device further provides illumination of the object when needed. Use of the present invention within a vacuum chamber is described, as this is the most typical application, however it should be recognized that the microscope device of the present invention may be beneficially employed within a variety of pressure vessels which provide either negative or positive pressures. Additionally a pressure vessel (vacuum chamber) may be used to surround the subject with various gasses at a specific pressure.

It will be appreciated that the invention can be implemented in a variety of ways without departing from the inventive principles. For example, the vacuum chamber itself may be configured as a housing for the elements of the present invention. The electronic imaging element is exemplified as a CCD (Charge Coupled Device) camera, which is preferred. Although not necessarily equivalent, certain non-CCD imagers may be employed.

Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. An apparatus for capturing magnified electronic images of objects being retained within a pressure vessel, comprising:
   (a) means for magnifying the image of an object;
   (b) means for converting the magnified image into electrical image signals which may be communicated outside of said pressure vessel; and
   (c) means for retaining said magnifying means and said converting means within the pressure vessel such that the magnified image is received upon a receiving area of said conversion means.

2. An apparatus as recited in claim 1, further comprising means for illuminating the object whose image is to be magnified.

3. An apparatus as recited in claim 1, further comprising means for housing the elements of the apparatus for capturing magnified electronic images, and retaining those elements at a pressure which differs from the surrounding pressure vessel.

4. An apparatus for collecting magnified images of objects from within a pressure vessel, comprising:
   (a) a housing retained within a pressure vessel, said housing configured with a transparent objective aperture;
   (b) an objective with a proximal end aligned with said transparent objective aperture and retained within said housing; and
   (c) an electronic image element retained in said housing and aligned toward a distal end of said objective such that magnified images of objects near the transparent objective aperture are received by the electronic image element from the objective and are converted to electrical signals.

5. An apparatus as recited in claim 4, wherein the objective comprises an optical lens for providing optical image magnification centered on an image axis.

6. An apparatus as recited in claim 4, further comprising an object illuminator retained near a distal end of said objective for providing light for illuminating objects toward the transparent objective aperture.

7. An apparatus as recited in claim 4, wherein said object illuminator is wired to a source of electrical power that may be turned on and off so that images of light sensitive objects may be obtained without additional illumination.

8. An apparatus as recited in claim 4, wherein said object illuminator comprises at least one LED connected to a source of electrical power.

9. An apparatus as recited in claim 6, further comprising a beam-splitter retained in alignment toward the distal end of said objective and angled so that light from said object illuminator is reflected off the surface of the beam-splitter toward the transparent objective aperture.

10. An apparatus as recited in claim 4, wherein the electronic image element is a CCD imager which converts the object image to a series of electrical signals.

11. An apparatus as recited in claim 4, wherein the housing is configured to provide a vacuum-proof seal surrounding the contents therein.

12. A method of collecting magnified images from within a pressure chamber, comprising the steps of:
   (a) positioning an object to be viewed within the pressure chamber;
   (b) magnifying the image of the object; and
   (c) conversion of the magnified image of the object to electronic signals for communication exterior of the pressure chamber.

13. A method as recited in claim 12, further comprising the step of illuminating the object from within the pressure chamber.

* * * * *